W. BAUCKMANN.
ICE CREAM CONE MACHINE.
APPLICATION FILED JUNE 28, 1909.

1,070,225.

Patented Aug. 12, 1913.
5 SHEETS—SHEET 1.

Witnesses
Inventor
W. BAUCKMANN
By H. C. Evert & Co
Attorneys

W. BAUCKMANN.
ICE CREAM CONE MACHINE.
APPLICATION FILED JUNE 28, 1909.

1,070,225.

Patented Aug. 12, 1913.

5 SHEETS—SHEET 2

Witnesses

Inventor
W. BAUCKMANN

Attorneys

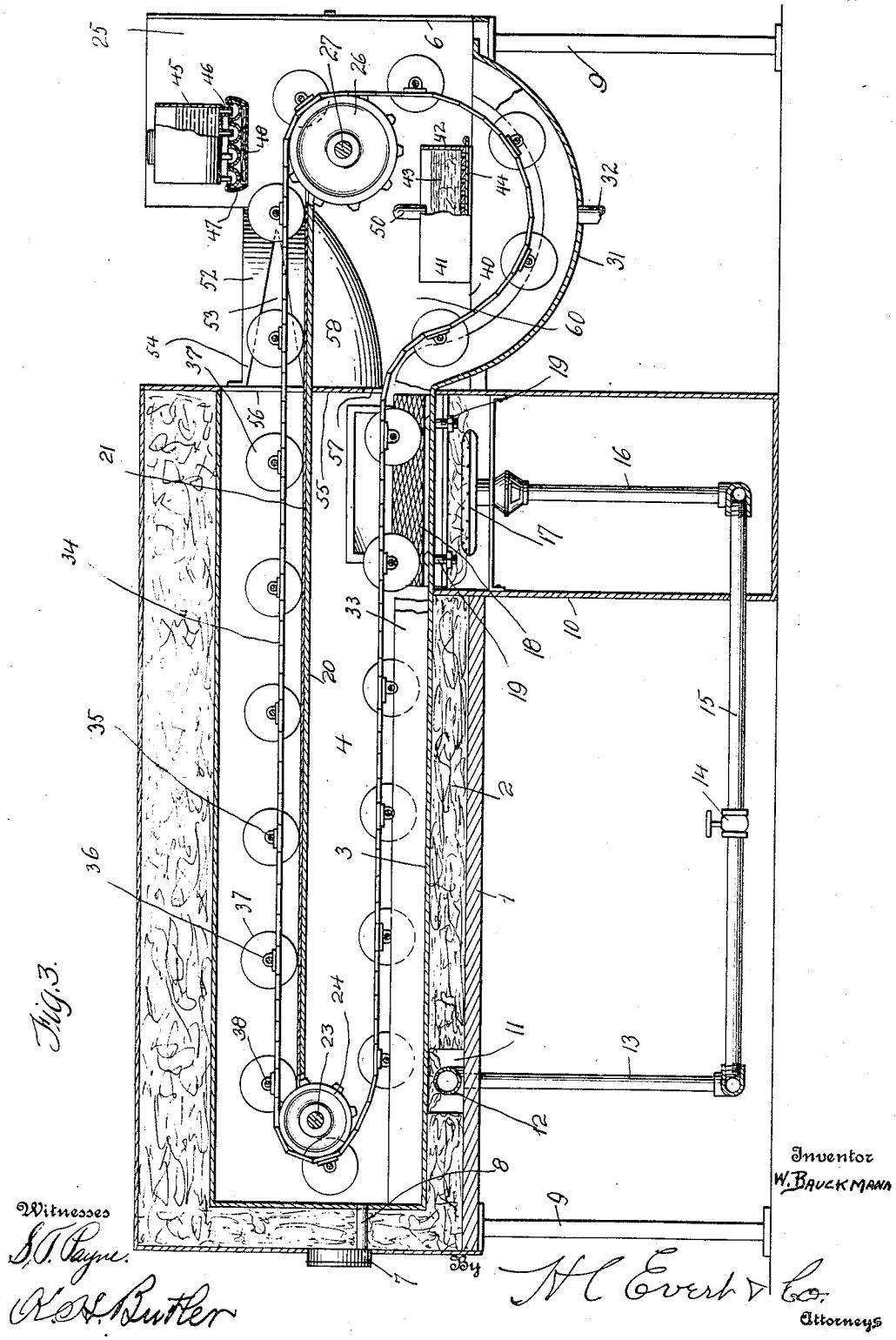

W. BAUCKMANN.
ICE CREAM CONE MACHINE.
APPLICATION FILED JUNE 28, 1909.
1,070,225.
Patented Aug. 12, 1913.
5 SHEETS—SHEET 4.
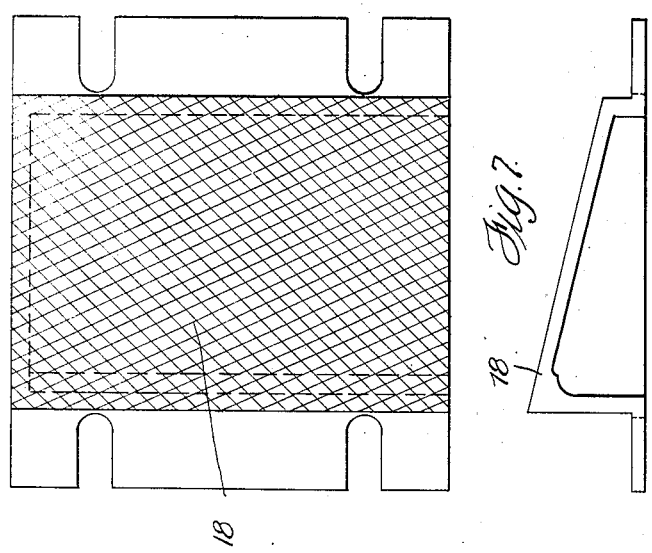
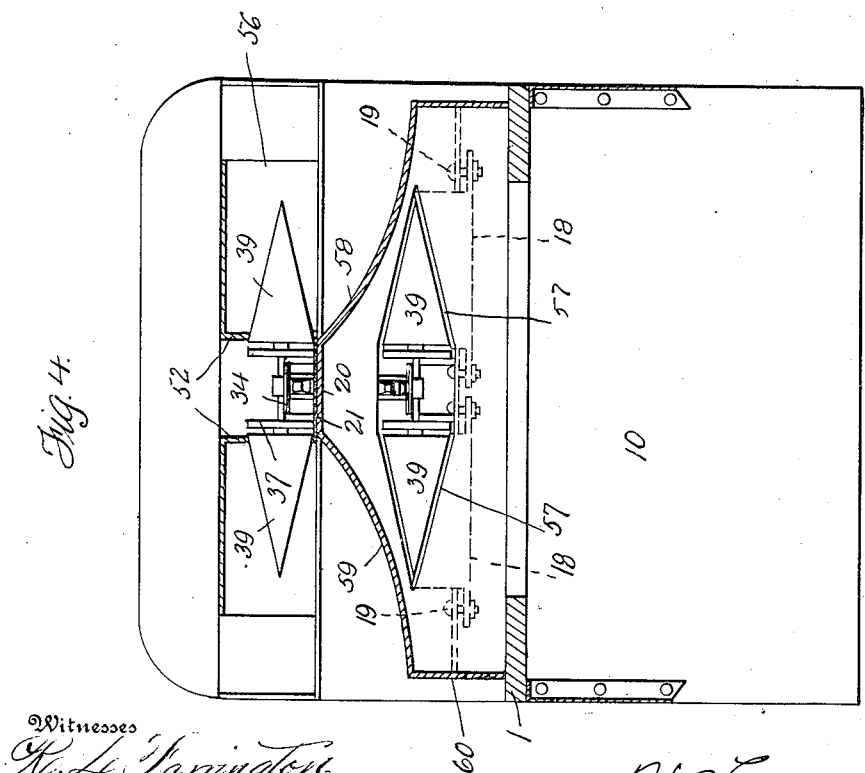

W. BAUCKMANN.
ICE CREAM CONE MACHINE.
APPLICATION FILED JUNE 28, 1909.

1,070,225.

Patented Aug. 12, 1913.

5 SHEETS—SHEET 5.

Witnesses
Samuel Payne
K. H. Butler

Inventor
W. Bauckmann
By H. Everitt
Attorneys.

UNITED STATES PATENT OFFICE.

WILLIAM BAUCKMANN, OF PITTSBURGH, PENNSYLVANIA.

ICE-CREAM-CONE MACHINE.

1,070,225.　　　　Specification of Letters Patent.　　Patented Aug. 12, 1913.

Application filed June 28, 1909. Serial No. 504,740.

*To all whom it may concern:*

Be it known that I, WILLIAM BAUCKMANN, a citizen of the United States of America, residing at Pittsburgh, in the county of Allegheny and State of Pennsylvania, have invented certain new and useful Improvements in Ice-Cream-Cone Machines, of which the following is a specification, reference being had therein to the accompanying drawing.

This invention relates to a machine for manufacturing pastry cones for the reception of ice-cream, fruits, jellies and ices, but generally known as ice-cream cones and the object thereof is to provide a machine for the purpose set forth which shall be comparatively simple in its construction, strong, durable, efficient in its use, conveniently operated, having a large output in a predetermined time, readily set up and conveniently attended to by the operator.

With the foregoing and other objects in view, the invention consists of the novel construction, combination and arrangement of parts hereinafter more specifically described and illustrated in the accompanying drawings, wherein is shown the preferred embodiment of the invention, but it is to be understood that changes, variations and modifications can be resorted to which come within the scope of the claims hereunto appended.

Figure 1:
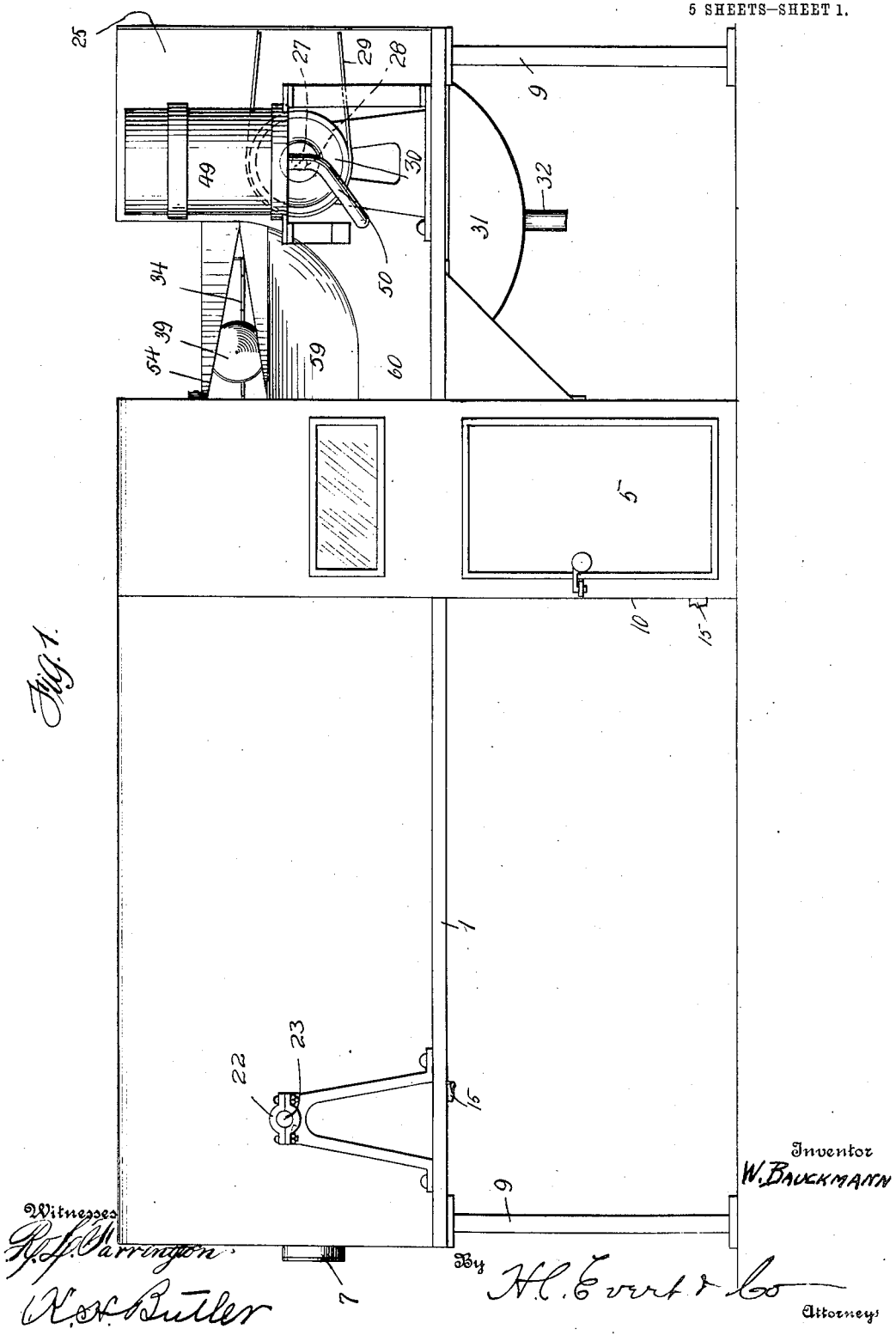
Figure 2:
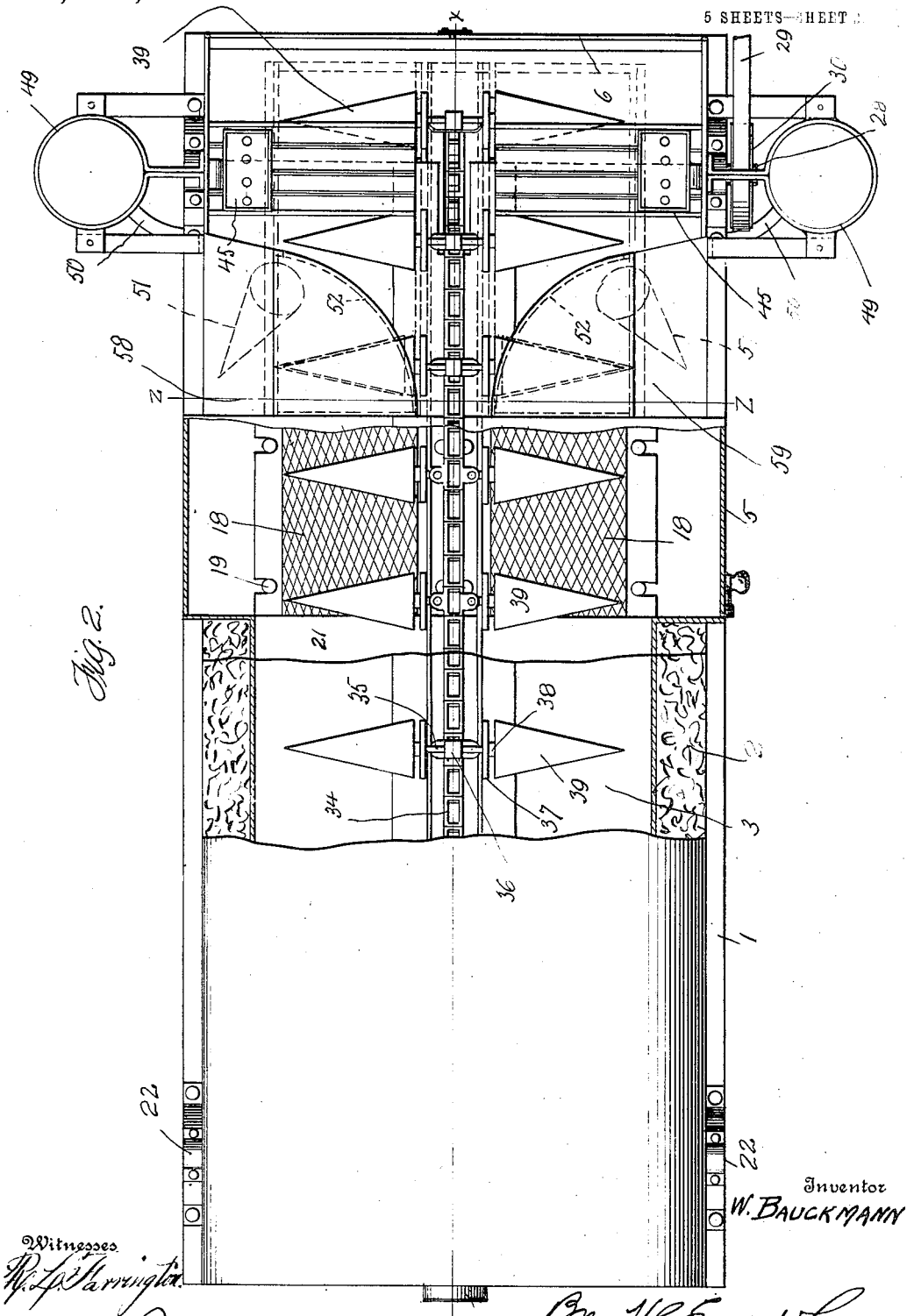
Figure 5:
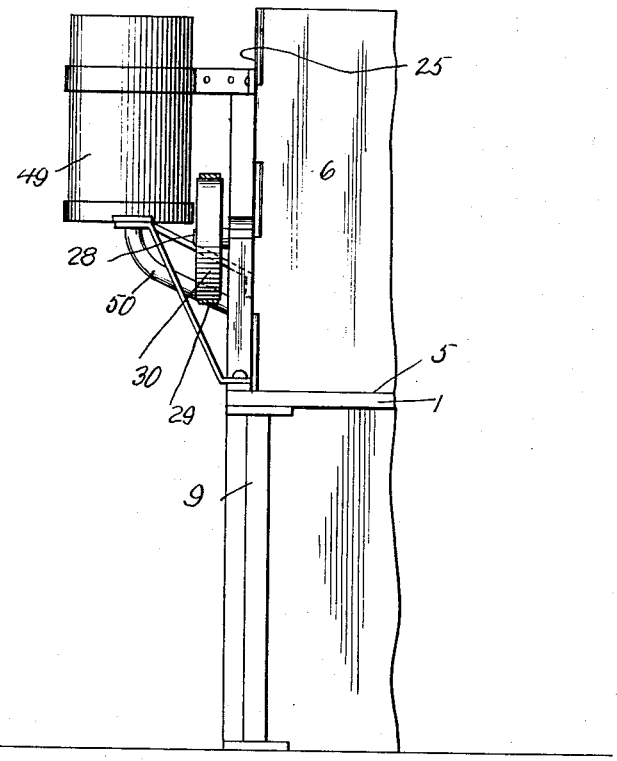
Figure 8:
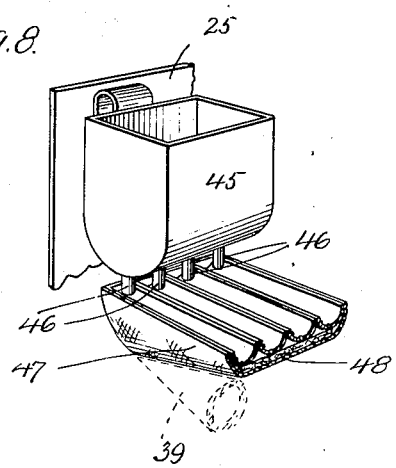

In the drawings, wherein like reference characters denote corresponding parts throughout the several views, Figure 1 is a side elevation of a pastry cone making machine constructed in accordance with this invention, Fig. 2 is a top plan, Fig. 3 is a longitudinal section on line $x$—$x$ of Fig. 2, Fig. 4 is a transverse section on line $z$—$z$ of Fig. 2, Fig. 5 is an end elevation, portions being broken away, Figs. 6 and 7 are respectively a plan and end view of one of the pressers and indenting plates, and, Fig. 8 is a perspective view of one of the grease tanks.

Referring to the drawings by reference characters, 1 denotes a rectangular casing having a lining of asbestos which supports a rectangularly and longitudinally extending receptacle 3 forming a baking and heating chamber 4. The casing is provided with suitable doors, as at 5, 6 so that access can be had to the interior of the machine. The casing is furthermore provided with a thermometer 7 which communicates, as at 8 with the interior of the heating chamber 4. The casing 1 is supported by a series of standards 9 and a casing 10 which is of such height as to engage the receptacle 3. The asbestos lining 2 for the bottom wall of the receptacle is cut away to provide a chamber 11 in which is arranged a gas burner 12 for heating the chamber 4. Depending from the burner 12 is a branch supply pipe 13 which is coupled by a valve body 14 to a branch supply pipe 15 extending within the casing 10 and connected to a vertically extending branch pipe 16 carrying a gas burner 17. The valve body 14 leads to a suitable gas supply. The burner 12 extends transversely of the casing 1. Two burners 17 are provided, one at each side of the machine, and each burner 17 not only assists in heating the chamber 4, but also heats a combined presser and indenting plate 18 which is arranged within the chamber 4 at the forward end thereof and which also extends at an inclination. The function of the plates 18 will be hereinafter referred to and each of the plates 18 is secured to the bottom of the receptacle 3 by holdfast devices 19.

Arranged within the chamber 4 and projecting from the forward end of said chamber 4 and secured within said chamber 4 is a longitudinally extending support 20 upon which is mounted a pair of tracks 21. Extending transversely of the casing 1 at one end thereof and journaled in the bearing 22 and further arranged in close proximity to the inner end of the support 20 is a shaft 23 provided with a cog wheel 24 disposed centrally of the chamber 4 and in proximity to the support 20. The casing 1 is provided with an extension 25, which projects from the forward end of the chamber 4 and is supported by certain of the standards 9. The extension 25 is not lined with asbestos as will be noticed by reference to Fig. 3. The support 20 projects into said extension and in close proximity to a cog wheel 26 mounted upon a transversely extending shaft 27 journaled in the bearings 28 carried by the extension 25 and driven through the medium of a belt 29 and a pulley 30, the latter being attached to the projecting end of the shaft 27. The belt 29 is connected to a suitable prime mover, (not shown). The bottom of the receptacle 3 projects from the forward end of the chamber 4 into a depending frame or extension. The depending portion of the bottom of the receptacle 3 is curvilinear in contour and indicated by the reference character 31 and forms the bottom of the extension 25. The said portion 31 is provided with an outlet pipe 32. Mounted upon the bottom of the receptacle 3 and also upon the projecting portion 31 of the bottom of the receptacle 3 are a pair of tracks 33, that portion of the tracks 33 within the receptacle 3 are parallel with the tracks 21. That portion of the tracks 33 which projects from the casing 3 is curvilinear in contour, that is to say of a contour similar to the projecting portion 31 of the bottom of the receptacle 3.

Arranged within the chamber 4 and projecting into the extension 25 and traveling over the cog wheels 24 and 26 is a carrier 34 formed of a series of slotted links. Disposed throughout the carrier 34 and spaced equal distance is a series of bearings 35 in each of which is journaled a shaft 36 of a length to project from each end of a bearing 35, so as to travel upon the pair of tracks 21 and the pair of tracks 33. Connected to each end of the shaft 36 is a head 37 provided approximately centrally thereof with a shank 38 which terminates in a forming core 39 conoidal in contour, the said forming core 39 extending at right angles with respect to the carrier, that is to say the cores are arranged in pairs owing to the fact that a core is connected with each end of the shaft 36, but the cores of each pair extend in opposite directions with respect to each other.

From the foregoing construction and arrangement of parts it is evident that when motion is transmitted to the cog wheel 26, the carrier 34 will have movement imparted thereto and rotate the wheel 24, as the carrier travels the forming cores 39 will be carried therewith and rotated.

Arranged with the extension 25 and mounted upon the support 40 is a pair of dough tanks 41, one at each side of the extension 25 and diagonally above the forming cores 39 of one side so that as the forming cores travel below the tank 41, the dough can be deposited upon them. Each of the tanks 41 is provided with an apertured bottom 42 through which is discharged the dough 43 and each of the tanks 41 is provided with a removable slide 44 which is utilized to close the deposit when filling the tank, but when it is desired to deposit dough upon the cores, the slide 44 is removed. The door 5 permits access to the interior of the extension so that the slide 44 can be removed.

Arranged at each side of the extension 25 and above a set of forming cores is a grease tank 45 which communicates by the discharge pipes 46 with a series of grease collecting perforated troughs 47, having secured thereto at the bottom thereof a greasing cloth 48 adapted to be engaged by the forming cores during the travel of said cores so as to grease the latter to enable the completed cone to be conveniently stripped from a forming core.

Exteriorly of the extension 25 and at each side thereof is arranged a dough reservoir 49 having a discharge pipe 50 which opens into tank 41 for supplying dough to the latter. There is a dough supply reservoir or tank associating with each of the tanks 41.

Each of the combined presser and indenting plates 18 is arranged below a set of forming cores 39 and in proximity to said cores so that when the dough is deposited upon the cores and as the cores travel over the plate 18, the plate associating with the core will not only cause a compressing of the dough so as to distribute it thoroughly over the core but will also provide the cone with suitable indentations or ornamentations which will be maintained owing to the fact that the cores with the cones thereon will pass through the heating chamber so that the cones will be thoroughly baked. As the cores with the cones thereon pass from the heating chamber 4 at the forward end thereof, the cones 51 are stripped from the rolls, (see Fig. 2). Two stripping devices are employed, one associating with each set of cores and the said stripping devices are arranged at the forward end of the chamber 4 and within the extension 25. As each stripping device is of the same construction but one will be described, the description of one applying to the other. Each stripping device consists of a curvilinear arm 52 secured to the casing 1 and provided with a V-shaped opening 53 to provide a pair of stripping edges 54. Each of the stripping devices curve outwardly toward their free ends and toward the side of the machine.

The forward end wall of the receptacle 3 and which is indicated by the reference character 55 is formed with openings 56, 57 for the passage of a core and depending from the support 20 at each side thereof is a plate 58, 59 upon which the stripped cones core when they are removed from the core into suitable receptacles arranged at the sides of the machine. The plates 58, 59 terminate in the side walls of the extension.

What I claim is:—

1. A pastry cone making machine comprising a baking chamber, cone shaped forming cores traveling into and out of said chamber, means exterior of said chamber for supplying dough to said cores, an inwardly extending and downwardly inclined combined cone presser and indenting plate arranged within the baking chamber and associating with the cores as they enter the baking chamber, and means for stripping the completed cones from the cores, said means arranged exteriorly of the baking chamber.

2. A pastry cone making machine comprising a baking chamber, cone shaped forming cores traveling into and out of said chamber, means exterior of said chamber for supplying dough to said cores an inwardly extending and downwardly inclined combined cone presser and indenting plate arranged within the baking chamber and associating with the cores as they enter the baking chamber, means for stripping the completed cones from the cores, said means arranged exteriorly of the baking chamber, and means for greasing the rolls subsequent to the stripping of the completed cones therefrom.

3. A pastry cone making machine comprising a baking chamber, tracks arranged therein, a carrier traveling into and through said chamber, cone forming cores, connections between the cores and said carrier, said connections traveling upon said tracks whereby the cores are rotated, means arranged exteriorly of the chamber for supplying dough to the cores, a combined presser and indenting plate associating with the cores and operating upon the dough carried by the cores, and stripping means for removing the completed cones from the cores, said stripping means arranged exteriorly of said chamber.

4. A pastry cone making machine comprising a baking chamber, tracks arranged therein, a carrier traveling into and through said chamber, cone forming cores, connections between the cores and said carrier, said connections traveling upon said tracks whereby the cores are rotated, means arranged exteriorly of the chamber for supplying dough to the cores, a combined presser and indenting plate associating with the cores and operating upon the dough carried by the cores, stripping means for removing the completed cones from the cores, said stripping means arranged exteriorly of said chamber and means for greasing the core subsequent to the stripping of the completed cones from the cores, said means arranged exteriorly of said chamber.

5. A pastry cone making machine comprising a baking chamber, a combined presser and indenting plate arranged within said chamber, means for heating said chamber and said plate, a carrier traveling through said chamber, rotatable cone shaped forming cores connected to the carrier and moving therewith and associating with said plate for compressing and indenting the dough upon the cores prior to the baking of the dough, means arranged exteriorly of said chamber for supplying dough to the cores, and means arranged exteriorly of said chamber for stripping the completed cones from the cores.

6. A pastry cone making machine comprising a baking chamber, a combined presser and indenting plate arranged within said chamber, means for heating said chamber and said plate, a carrier traveling through said chamber, rotatable cone shaped forming cores connected to the carrier and moving therewith and associating with said plate for compressing and indenting the dough upon the cores prior to the baking of the dough, means arranged exteriorly of said chamber for supplying dough to the cores, means arranged exteriorly of said chamber for stripping the completed cones from the cores and means arranged exteriorly of said chamber for greasing the cores subsequent to the stripping of the cones from the cores.

7. A pastry cone making machine comprising a baking chamber, a presser and indenting plate arranged within said chamber, means for heating said chamber, and said plate, a carrier traveling through said chamber, cone shaped forming cores connected with said carrier, means for rotating the cores during the travel of the carrier, said cores associating with said plate for pressing and indenting the dough upon the cores prior to the baking of the dough to form a cone, means arranged exteriorly of said chamber for supplying dough to the cores and means arranged exteriorly of said chamber for stripping the completed cones from the cores.

8. A pastry cone making machine comprising a baking chamber, a presser and indenting plate arranged within said chamber, means for heating said chamber and said plate, a carrier traveling through said chamber, cone shaped forming cores connected with said carrier, means for rotating the cores during the travel of the carrier, said cores associating with said plate for pressing and indenting the dough upon the cores prior to the baking of the dough to form a cone, and means arranged exteriorly of said chamber for supplying dough to the cores and a curvilinear arm arranged exteriorly of said chamber and provided with a pair of oppositely disposed inclined stripping edges for removing the completed cones from the cores.

9. A pastry cone making machine comprising a baking chamber, a presser and indenting plate arranged within said chamber, means for heating said chamber and said plate, a carrier traveling through said chamber, cone shaped forming cores connected with said carrier, means for rotating the cores during the travel of the carrier, said cores associating with said plate for pressing and indenting the dough upon the cores prior to the baking of the dough to form a cone, means arranged exteriorly of said chamber for supplying dough to the cores, means arranged exteriorly of said chamber for stripping the completed cones from the cores and means arranged exteriorly of said chamber for greasing the cores subsequent to the stripping off of the cones.

10. A pastry cone making machine comprising a baking chamber, a presser and indenting plate arranged within said chamber, means for heating said chamber and said plate, a carrier traveling through said chamber, cone shaped forming cores connected with said carrier, means for rotating the cores during the travel of the carrier, said cores associating with said plate for pressing and indenting the dough upon the cores prior to the baking of the dough to form a cone, means arranged exteriorly of said chamber for supplying dough to the rolls and a curvilinear arm arranged exteriorly of said chamber and provided with a pair of oppositely disposed inclined stripping edges for removing the completed cones from the cores, and means arranged exteriorly of said chamber for greasing the cores subsequent to the stripping off of the completed cones from the cores.

11. A pastry cone making machine comprising a baking chamber, a presser and indenting plate arranged within said chamber, means for heating said chamber and said plate, a carrier traveling through said chamber, cone shaped forming cores connected with said carrier, means for rotating the cores during the travel of the carrier, said cores associating with said plate for pressing and indenting the dough upon the cores prior to the baking of the dough to form a cone, means arranged exteriorly of said chamber for supplying the dough to the cores, means arranged exteriorly of said chamber for stripping the completed cones from the cores, means arranged exteriorly of said chamber for greasing the cores subsequent to the stripping off of the cones and means for operating the carrier.

12. A pastry cone making machine comprising a baking chamber, a presser and indenting plate arranged within said chamber, means for heating said chamber and said plate, a carrier traveling through said chamber, cone shaped forming cores connected with said carrier, means for rotating the cores during the travel of the carrier, said cores associating with said plate for pressing and indenting the dough upon the cores prior to the baking of the dough to form a cone, means arranged exteriorly of said chamber for supplying dough to the cores and a curvilinear arm arranged exteriorly of said chamber and provided with a pair of oppositely disposed inclined stripping edges for removing the completed cones from the cores and means for operating the carrier.

In testimony whereof I affix my signature in the presence of two witnesses.

WILLIAM BAUCKMANN.

Witnesses:
GEORGE W. EVANS,
N. LOUIS BOGAN.